United States Patent
Ridlon et al.

(10) Patent No.: US 7,921,452 B2
(45) Date of Patent: Apr. 5, 2011

(54) DEFINING CONSISTENT ACCESS CONTROL POLICIES

(75) Inventors: Stephen A. Ridlon, Issaquah, WA (US); Richard V. Robinson, Seattle, WA (US); James P. Tjelle, Bellevue, WA (US); Keith Williamson, Bothell, WA (US)

(73) Assignee: The Boeing Company, Chicago, IL (US)

( * ) Notice: Subject to any disclaimer, the term of this patent is extended or adjusted under 35 U.S.C. 154(b) by 1625 days.

(21) Appl. No.: 11/209,985

(22) Filed: Aug. 23, 2005

(65) Prior Publication Data

US 2007/0056018 A1    Mar. 8, 2007

(51) Int. Cl.
*H04L 9/00* (2006.01)
(52) U.S. Cl. .......................................... 726/1
(58) Field of Classification Search ................. 726/1
See application file for complete search history.

(56) References Cited

U.S. PATENT DOCUMENTS

| | | | |
|---|---|---|---|
| 6,023,765 A | 2/2000 | Kuhn | |
| 6,324,647 B1 | 11/2001 | Bowman-Amuah | |
| 6,640,307 B2 | 10/2003 | Viets et al. | |
| 7,340,469 B1 * | 3/2008 | Alghathbar et al. ................. | 1/1 |
| 7,590,698 B1 * | 9/2009 | Cooley ........................... | 709/206 |
| 2002/0002577 A1 * | 1/2002 | Garg et al. .................... | 709/104 |
| 2004/0093518 A1 | 5/2004 | Feng et al. | |
| 2004/0193909 A1 | 9/2004 | Chang et al. | |
| 2005/0166260 A1 * | 7/2005 | Betts et al. ....................... | 726/4 |
| 2006/0090131 A1 * | 4/2006 | Kumagai ..................... | 715/700 |

FOREIGN PATENT DOCUMENTS

| | | |
|---|---|---|
| WO | WO 01/33349 A2 | 5/2001 |
| WO | WO 02/101975 A1 | 12/2002 |
| WO | WO 2005/009003 A1 | 1/2005 |

OTHER PUBLICATIONS

Johnson, M. et al., KAoS Semantic Policy and Domain Services: An Application of DAML to Web Services-Based Grid Architectures; Proceedings of the AAMAS 03 Workshop on Web Services and Agent-Based Engineering; Melbourne, Australia; 2003.

Suri, N., et al., DAML-based Policy Enforcement for Semantic Data Transformation and Filtering in Multi-agent Systems; Proceedings of the Autonomous Agents and Multi-Agent Systems Conference (AAMAS 2003); Melbourne, Australia; New York, NY: ACM Press; 2003.

(Continued)

*Primary Examiner* — Kambiz Zand
*Assistant Examiner* — Aubrey H Wyszynski
(74) *Attorney, Agent, or Firm* — Harness, Dickey & Pierce, P.L.C.

(57) ABSTRACT

A method of defining policies for controlling access to resources of a system. Authorization requirements for the system are modeled to obtain a model expressing each of a plurality of access control policies as a constraint. From the model is generated a single policy set in an authorization markup language that captures the requirements. This method can be used to define role-based access control policies in a format that can be adapted for input to a variety of access control mechanisms. This generative approach to access control design allows maintenance to be performed at the requirements level.

17 Claims, 3 Drawing Sheets

OTHER PUBLICATIONS

Tonti, G., et al., Semantic Web Languages for Policy Representation and Reasoning: A Comparison of KAoS, Rei, and Ponder; Submitted to the International Semantic Web Conference (ISWC 03); Sanibel Island, Florida; 2003.

Uszok, A., et al., KAoS Policy and Domain Services: Toward a Description-Logic Approach to Policy Representation, Deconfliction, and Enforcement; Proceedings of Policy 2003; Como, Italy, in press; 2003.

Uszok, A., et al., DAML Reality Check: A Case Study of KAoS Domain and Policy Services; Submitted to the International Semantic Web Conference (ISWC 03); Sanibel Island, Florida; 2003.

Adda et al., MceTech, Jan. 19, 2005.

Hannover et al., Rule-based Policy Specification: State of the Art and Future Work, 2004.

Damianou et al., A Survey of Policy Specification Approaches, Apr. 2002.

XACML, Aug. 23, 2005.

Unified Modeling Language, Aug. 23, 2005.

Ray et al., Using UML to Visualize Role-Based Access Control Constraints, 2004.

IBM Rational Software Modeler, Oct. 2004.

Ferraiolo et al., Role Based Access Control, Aug. 23, 2005.

White Papers and Business Guides, Aug. 23, 2005.

Acevedo et al., Enterprise Security Applications of Partition Rule Based Access Control (PRBAC), Aug. 23, 2005.

Manish Verma, XML Security: Control information access with XACML, Aug. 23, 2005.

\* cited by examiner

DEFINING CONSISTENT ACCESS CONTROL POLICIES

CROSS-REFERENCE TO RELATED APPLICATIONS

This application is related to U.S. patent application Ser. No. 11/209,987, filed on the same date as this application. The disclosure of the foregoing related application is incorporated herein by reference in its entirety.

FIELD OF THE INVENTION

The present invention relates generally to controlling access to resources of a system and more particularly (but not exclusively) to defining access control policies to control access to resources.

BACKGROUND OF THE INVENTION

In large-scale systems-of-systems (SoSs) and/or distributed systems, many different authorization or access control mechanisms may be utilized to control access to system resources such as databases, files, servers, etc. Developing, implementing and maintaining access control requirements currently is for the most part a manual, non-standardized process. Inconsistencies in how such requirements are developed can make the entire process error-prone and costly to administer.

SUMMARY OF THE INVENTION

The present invention, in one implementation, is directed to a method of defining policies for controlling access to resources of a system. Authorization requirements are modeled for the system to obtain a model representing contents of access control policies. From the model is generated a single set of attribute-based policies expressed in an authorization markup language and capturing the contents.

In another implementation, the invention is directed to a method of defining policies for controlling access to resources of a system. Authorization requirements for the system are modeled to obtain a model expressing each of a plurality of access control policies as a permit constraint or as a deny constraint. From the model is generated a single policy set in an authorization markup language that captures the requirements.

In yet another implementation, an apparatus for defining policies for controlling access to resources of a system includes a processor and memory. The processor and memory are configured to model authorization requirements for the system to obtain a model expressing each of a plurality of attribute-based access control policies as a constraint. The processor and memory are further configured to generate from the model a single policy set in an authorization markup language that captures the access control policies.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF EMBODIMENTS

The following description of various embodiments is merely exemplary in nature and is in no way intended to limit the invention, its application, or uses.

The present invention, in some implementations, is directed to methods and apparatus for defining security policies for controlling access to resources in a computerized system. Such systems may include distributed systems and/or systems-of-systems (SoSs). Such systems typically have a plurality of resources, including but not limited to files, databases, directories, servers, etc., each of which may have one of a plurality of different security mechanisms. In some implementations of the invention, authorization policies are defined in a single language and format, e.g., to facilitate expression of the policies across a plurality of access control domains.

Defining security authorization policies typically is begun by defining authorization requirements. Such requirements may be derived from one or more information repositories at the human level. In a large enterprise, e.g., a system-of-systems (SoS), a variety of sets of security requirements are typically documented in information repositories. Requirements could include policies in areas such as export control regulations, business contracts, proprietary information agreements, company policies, and operation guidelines. In an authorization context, it is human security policies that define "who can access what".

Figure 1:
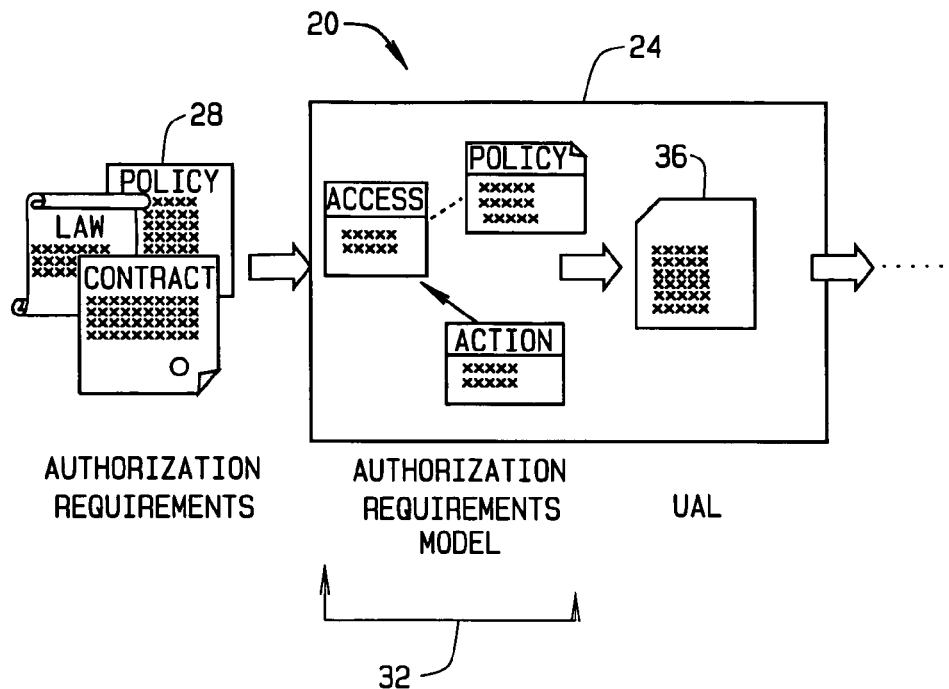
FIG. 1 is a block diagram of an apparatus for defining policies for controlling access to resources of a system in accordance with one implementation of the invention.

Such authorization requirements may be input to one configuration of an apparatus for defining policies for controlling access to resources of a system as indicated generally in FIG. 1 by reference number 20. The apparatus 20 includes a computer 24 having a processor and memory. It can be appreciated that although a single computer is shown in FIG. 1, other configurations could include more than one computer, processor and/or memory. The computer 24 is configured to model authorization requirements 28 for the system to obtain a model 32 representing contents of access control policies. From the model 32 is generated a single set 36 of attribute-based policies capturing the requirements. The policy set 36 is expressed in an authorization markup language.

In some implementations of the invention, a Unified Modeling Language (UML) profile, i.e., a set of UML stereotypes, is defined to support access control requirements and used to model the access control requirements 28. An authorization markup language, referred to herein as a Universal Authorization Language (UAL), may be used to transform the requirements 28 from the standards-based UML model 32 into a format that can, for example, be adapted to populate a plurality of heterogeneous access control systems or mechanisms. The UAL may be, for example, a subset of XACML (extensible Access Control Markup Language). It should be noted, however, that other modeling languages and/or markup languages could be used in other implementations of the invention. The computer 24 also is configured to perform UML model consistency checking and UAL policy consistency checking.

The UAL is generated to provide a single set of policies adaptable, for example, for enforcement in a target system. The UAL policy set 36 is directly derived from the UML model 32. Accordingly, the UAL policies 36 appropriately reflect the original natural-language requirements 28 incorporated into the UML model 32. The policy set 36 may be adapted and implemented into a target system for enforcement per specifications of the security requirements. Defining policies in accordance with various implementations of the invention can be an iterative and circular process. New access control requirements typically trigger a UML model update, UAL policy re-generation, and updates to end target systems.

An example shall now be described to illustrate a context in which the invention may be implemented. Consider a scenario in which an enterprise, "Company A", has two partners, "Partner B" and "Partner C", with whom it shares documents. Legal contracts with the partners permit Partner C employees to view engineering images and Partner B employees to view wiring images. Company A further requires that engineering images viewed by partners must include digital watermarks. (Company A employees can view watermarked or non-watermarked engineering images.) US law stipulates that only US Persons can view EAR sensitive information.

Company A maintains shared documents on a Linux system that uses access control lists (ACLs) to control access to directories and files. Other shared documents are maintained on a Web server that uses Policy-enabled, Role Based Access Control (P-RBAC) software for authorization decisions.

As previously mentioned with reference to FIG. 1, a user, e.g., a Company A security administrator, can capture the foregoing security requirements, model them using UML, and automatically generate a policy set representation in UAL, which in the present implementation is a subset of XACML. The XACML representation can be adapted to provide appropriate ACLs for the Linux system. Similarly, the XACML representation can be adapted to provide a representation of the policy set for the P-RBAC system used by the Web server.

Continuing the above example, Mary is a Company A employee, Ike is a Partner C employee, and Francis is a Partner B employee. Mary is a US Person and Ike and Francis are not. After the administrator has applied the policy set to the target systems, when Mary, Ike, or Francis uses either the Linux system or the Web server to access documents, they encounter consistent access control policies that reflect the original security requirements. Mary is able to view wiring and engineering images, including EAR-sensitive ones. She can also read watermarked or non-watermarked images. Ike can view watermarked engineering images that are not EAR-sensitive. Francis can view wiring images that are not EAR-sensitive. For example, when Francis uses the web to browse documents in a particular P-RBAC controlled folder, he sees only a non-EAR sensitive wiring document. In contrast, when Mary accesses the same folder, she is permitted to view more types of information, including wiring and engineering, watermarked and non-watermarked, EAR-sensitive and non-EAR-sensitive documents.

Figure 2:
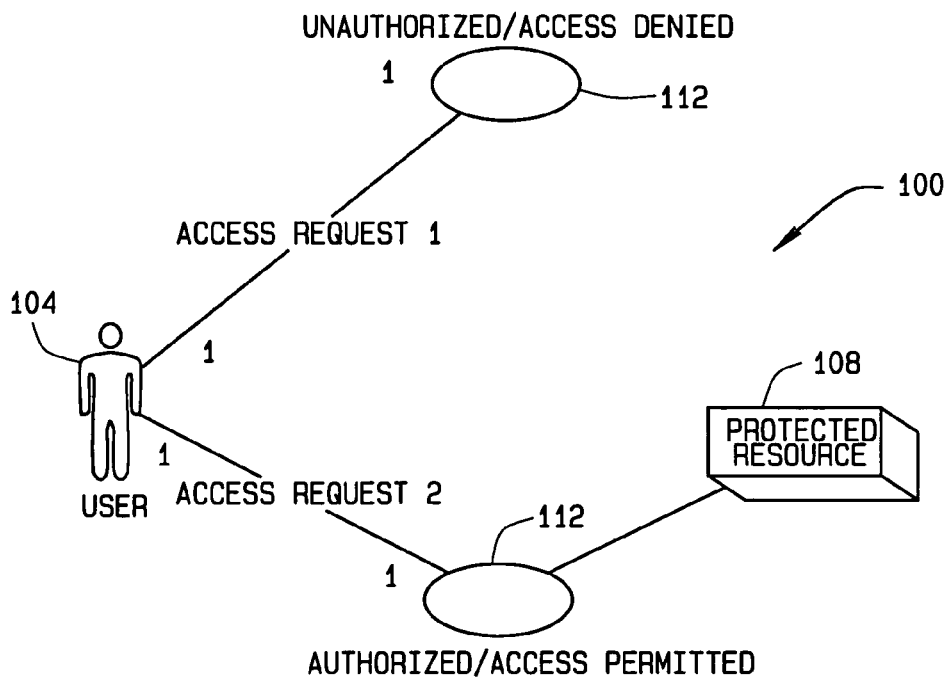
FIG. 2 is a use case diagram modeling policy content in accordance with one implementation of the invention.

In some configurations, authorization requirements are captured and expressed using the Unified Modeling Language (UML) and Object Constraint Language (OCL). General authorization and access control requirements can be modeled in a standard UML use case diagram indicated generally in FIG. 2 by reference number 100. In the diagram 100 are modeled a user 104 making a request relative to a resource 108. As illustrated in FIG. 2, at a top level of abstraction there are only two cases 112: Authorized/Access Permitted, and Unauthorized/Access Denied.

The foregoing use cases could be implemented in various access control environments. For example, in a policy-driven role-based access control environment, an attempt to access some protected information resource would be intercepted by a policy enforcement point (PEP). An enforcer would provide information about the requesting entity, the nature of the access requested, and the targeted resource to a policy decision point (PDP). The decision point would consult an access control policy to determine whether the requestor has privileges sufficient to authorize the requested access, and would return a decision to the enforcement point.

In some implementations of access control policy models, standard UML stereotype and profile extension mechanisms are used to provide model elements specific to the authorization and access control problem domain. In some implementations of the invention, a UML model is built that represents the contents of policies as would be consulted by decision points. Such modeling is in contrast to modeling to represent an access control system per se. Modeling analysis in accordance with principles of the invention is abstract, yet complete enough to expose the fundamental elements to be considered when modeling authorization requirements specific to a given information system.

One implementation of a model for expressing access control policy employs five core elements: Subject, Role, Action, Resource, and Constraint. A Subject element represents a human user or a system component (such as a server process) acting on behalf of a person. In the context of an access control scenario, the Subject initiates a request to access some Resource. Each Subject has one or more identifying attributes, including but not limited to any number of assigned Roles. Roles may represent job functions, resource ownership, levels of authority, etc. As such, a Role can serve as a mechanism for aggregating individual Subjects into groups. Groups may be collectively permitted or denied access permissions on resources. Examples of Roles may be US Person, Company A Engineer, Partner B Engineer, Partner C Engineer, etc.

Actions define types of access that may be requested relative to Resources and may include, e.g., read, write, etc. In an object-oriented system, some Actions may represent methods of target Resource objects. Resources represent information objects that are protected against unauthorized access. In some implementations, a granularity at which Resources are defined is not specified. Examples of Resources may be files, server systems, databases or database records, URLs, etc. Whatever the level of resource division, protected resources can be identified with attributes relevant to an access control policy being defined, for example, a "type" of resource, and/or whether a resource contains export sensitive information.

Constraints are used to define a logical content of individual access control policies being defined in the system. In some models configured in accordance with principles of the invention, Constraint logic is expressed in the Object Constraint Language (OCL). OCL statements include Boolean expressions that refer to objects represented by elements in the model and their attributes. In some implementations, two types of Constraints are defined: one Constraint is to Permit access and the other Constraint is to Deny access. Semantically, a Permit Constraint expresses a condition under which an access is allowed, and a Deny Constraint expresses a condition under which an access is explicitly disallowed.

Figure 3:
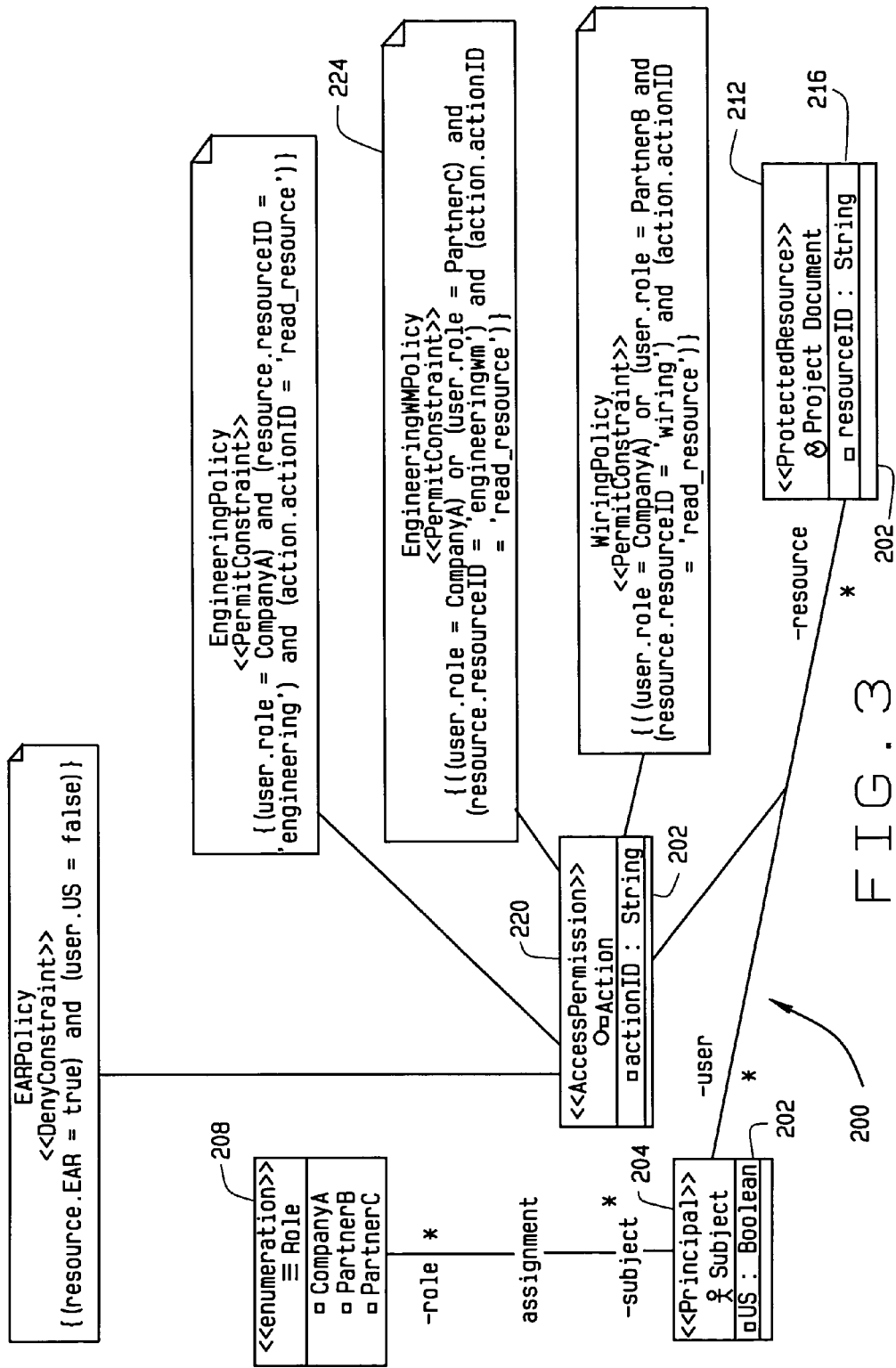
FIG. 3 is a UML requirements model in accordance with one implementation of the invention.

An example of a complete model expressing a set of access control policies that protect information in a collaborative engineering support system is indicated generally in FIG. 3 by reference number 200. The model 200 represents a plurality of use case instantiations as class diagrams 202. The model 200 models an engineering system with Subjects 204 that act on behalf of end users. Users are assumed to be authenticated into the system, and authorization-relevant attributes of every Subject 204 are determinable. Such attributes may include, e.g., Roles 208 assigned to a Subject and/or whether or not the Subject represents a US Person. Subjects 204 may make requests to access protected resources known as Project Documents 212. Each Project Document 212 has an ID 216 that specifies what type of information it carries, as well as an attribute indicating whether or not the information is export restricted. Every access attempt that Subjects 204 can make on Project Documents 212 is mediated by an Action 220. Actions 220 are constrained by Policies 224 that dictate conditions under which a given Action 220 (invoked by a specific Subject 204, on a specific Project Document 212) is explicitly permitted or denied.

In some implementations, IBM Rational System Architect (IBM/RSA) is used as a UML model-authoring environment. Capabilities may be added via a "plug-in" architecture. Automated policy generation may be performed using a plug-in that operates on an authorization requirements model as follows:

The entire authorization requirements model is traversed.
All Deny Constraints and Allow Constraints are extracted.
OCL contained in each Constraint is parsed.
One or more XACML Rules are constructed for each Constraint.
The Rules are inserted into a stylized XACML Policy Set.
The Policy Set is output as an XML file.

The plug-in may be written, for example, in Java. OCL parsing may be performed, for example, using an ANTLR grammar.

UNIVERSAL AUTHORIZATION LANGUAGE

In light of costs typically associated with administering the current diversity of access control technologies, a single language for the expression of policy across access control domains is desirable. For broad applicability, it can be desirable for a UAL to be flexible, extensible, and a widely accepted standard. XACML is an emerging standard language that expresses policy for controlling access to actions by subjects on resources. A subject represents an authenticated user or an authenticated system account. A resource is any data object that is accessible to subjects. An action is any well-defined operation that a subject might wish to perform on a resource. Actions, subjects, and resources all have attributes whose values may be looked up during policy evaluation.

The XACML specification does not contemplate that actions, roles, or resources might have hierarchical relationships with each other or that they might inherit policy from each other. The XACML specification also does not contemplate that policy might live in administrative domains that have hierarchical relationships with each other.

Figure 4:
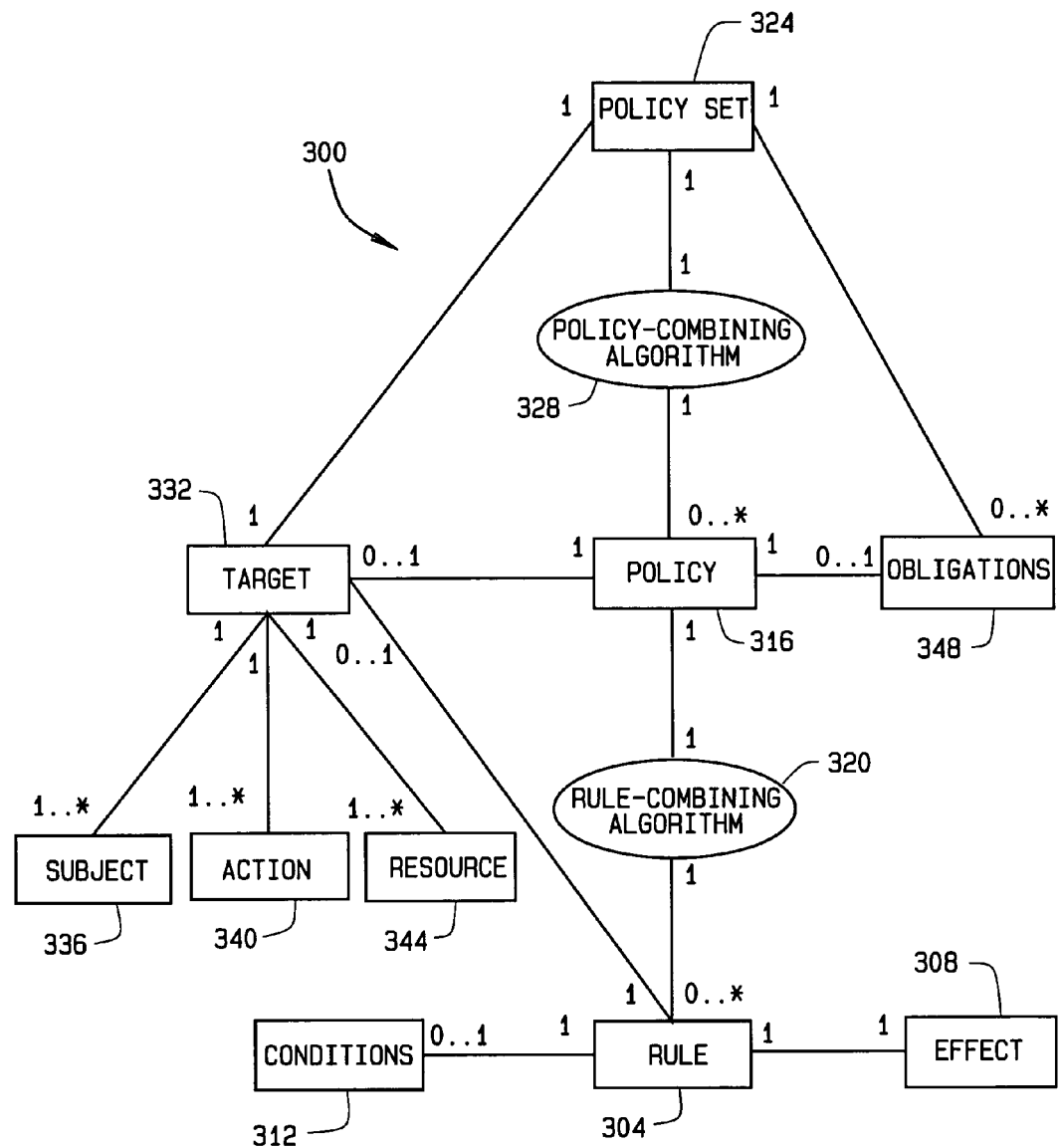
FIG. 4 is a block diagram illustrating elements of XACML.

Relationships among key elements of XACML are indicated generally in FIG. 4 by reference number 300. Policy conditions are contained in XML <Rule> elements 304. <Rule> elements each have an "Effect" attribute_with a value of either "Permit" or "Deny". A rule's effect has consequences only when the rule's <Condition> element 312 evaluates to true. Effects of multiple rules may be combined into a <Policy> element 316 using one of several possible combining algorithms 320. Policies 316 may be combined into <PolicySet> elements 324 using one of several possible combining algorithms 328. The applicability of policies 316 and policy sets 324 is restricted through the use of <Target> elements 332. A target specifies the set of subjects 336, actions 340, and resources 344 that "match" a particular policy 316 or policy set 324. Obligations 348 may be associated with policies or with policy sets and become activated when the combined effect of a policy or policy set is "Permit".

In operation, an XACML PEP may construct a "request context" specifying the attributes of a particular subject, action, and resource. The request context is sent to a PDP, which determines the applicable policies, and combines the effects of the relevant rules using the appropriate combining algorithms. The result (along with any associated obligations) is sent back to the PEP for enforcement.

XACML contains some features (obligations and some of the combining algorithms, for example) that do not map cleanly to any known target access control system. Accordingly, we have defined a subset of XACML for use as a UAL. In one implementation, the UAL is based on plain XACML version 1.1 with no support for hierarchies or other advanced features. The UAL is configured to permit a single expression of policy to be adapted to and enforced in a plurality of target access control systems. The UAL subset of XACML preferably is rich enough to support adaptation to existing access control targets, yet simple enough to permit efficient and correct implementation.

In XACML, it is possible to express policy conditions as part of <Target> elements that act to restrict the set of policies that apply to a particular access request. Target systems typically do not need this sort of flexibility in order to express useful policies, so we restrict targets to specifying just the name of the action and the name of the resource. In the UAL, all policy conditions are contained in <Rule> elements.

XACML allows <PolicySet> elements to contain other policy sets, with different combining algorithms at each level. The UAL, however, uses a single <PolicySet> element that may contain several <Policy> elements, each of which may contain several <Rule> elements. Only the "deny-overrides" combining algorithm is recognized by the UAL.

The XACML specification allows attributes of actions to be used in policy. No known policy target needs this feature, so the UAL does not currently support it.

XACML requires that both policy sets and policies specify targets. Since the UAL has only a single policy set, it does not need a restrictive <Target> element. The policy set in the UAL therefore has a wildcard target as follows:

```
<Target>
    <Subjects><AnySubject/></Subjects>
    <Resources><AnyResource/></Resources>
    <Actions><AnyAction/></Actions>
</Target>
```

The UAL uses the <Target> element of a policy to specify the names of the action and resource to which the policy applies. The UAL allows either or both of these to be wildcarded. Other than the wildcard mechanism, the UAL does not allow a policy target to match more than one action or resource. In the UAL, <Target> elements refer to resource and action names using the XACML standard attributes, "resource-id" and "action-id". No other attributes may be specified in a UAL <Target> element. The following example shows a <Target> element specifying the "read_resource" action on the "engineering" resource:

```
<Target>
    <Subjects>
        <AnySubject/>
    </Subjects>
    <Resources>
        <Resource>
            <ResourceMatch MatchId="&function;string-equal">
                <AttributeValue
                    DataType="&xml;string">engineering</AttributeValue>
                <ResourceAttributeDesignator
                    DataType="&xml;string"
                    AttributeId="urn:oasis:names:tc:xacml:1.0:resource:resource-id"/>
            </ResourceMatch>
        </Resource>
    </Resources>
    <Actions>
        <Action>
            <ActionMatch MatchId="&function;string-equal">
                <AttributeValue
                    DataType="&xml;string">read_resource</AttributeValue>
                <ActionAttributeDesignator
                    DataType="&xml;string"
                    AttributeId="&action;action-id"/>
            </ActionMatch>
        </Action>
    </Actions>
</Target>
```

Note that the subject in the above target is wildcarded ("AnySubject"). A policy, for example, controlling read access by non-citizens to any resource could be implemented using a <Target> element with a wildcard resource and a specific action. A UAL policy set generated from the model_ (shown in FIG. 3) is incorporated herein as Appendix A and uses a wildcard Deny policy and specific Permit policies.

In XACML, multiple policies may apply to the same access request and each policy may contain multiple <Rule> elements with differing <Effect> elements. Within the constraints on the content of <Target> elements, the UAL is consistent with XACML. <PolicyId> and <RuleId> elements are allowed.

The XACML specification defines four algorithms for combining the Effects of policies and rules: deny-overrides, permit-overrides, first-applicable, and only-one-applicable. With the deny-overrides algorithm, any rule or policy with an Effect attribute of "Deny" takes precedence over rules or policies with an Effect attribute of "Permit. Further, users of the XACML specification are allowed to define their own combining algorithms. Since complexity increases with the number of combining algorithms and useful policies can be crafted with just a single combining algorithm, the UAL only supports the deny-overrides combining algorithm.

The UAL supports operations on strings, booleans, and bags containing those types. The following XACML functions are supported in UAL:

Comparison functions:
    boolean-equal (test for Boolean equality)
    string-equal (test for string equality)
Logical functions:
    and (conjunction of two Booleans)
    or (disjunction of two Booleans)
    not (negation of a Boolean)
Bag functions:
    string-is-in (test for membership of a string in a bag)
    boolean-one-and-only (extraction of a single boolean value from a bag)
    any-of (a primitive value matches at least one member of a bag)
    all-of (a primitive value matches all members of a bag)
    any-of-any (at least one member of the first bag matches a member of the second bag)
    any-of-all (at least one member of the first bag matches all members of the second bag)
    all-of-any (at least one member of the second bag matches all members of the first bag)
    all-of-all (all members of the first bag match all members of the second bag)
    string-one-and-only (a single string extracted from a bag)

In the UAL, the string-is-in function is used to test a particular role against a "role" attribute of a subject. The boolean-one-and-only function is only used to fetch boolean-valued attributes of subjects and resources.

In XACML, the functions that fetch attributes from subjects or resources always return bags. Thus, all tests of attribute values require the specification of the particular attribute, nested within a bag function that either checks for existence or returns a scalar. The following <Rule> tests to see if the subject holds a particular role:

```
<Rule RuleId="Rule1" Effect="Permit">
    <Condition FunctionId="&function;string-is-in">
        <AttributeValue
            DataType="&xml;string">CompanyAEmployee</AttributeValue>
        <SubjectAttributeDesignatorDataType="&xml;string"
            AttributeId="urn:oasis:names:tc:xacml:1.0:example:subject:role"/>
    </Condition>
</Rule>
```

The above <Rule> fetches a bag containing the (possibly multiple) values of the subject's "role" attribute and then tests whether the string "CompanyAEmployee" is in the bag. If the string-is-in function returns a true value, then the <Rule> returns its Effect value of "Permit" for combining with the Effects of any other <Rule> elements in the containing <Policy> element.

The XACML specification envisions a Policy Information Point (PIP) that is responsible for managing and distributing attribute information for actions, subjects, and resources. In some implementations of the invention, subject attributes may be stored in an XML file. It also is contemplated that an LDAP directory, an SQL database, etc. could be used to store attributes. Resource attributes may be stored in XML that is wrapped around each protected resource.

The XACML specification envisions a Policy Administration Point (PAP) to facilitate policy administration, but does not specify details of the PAP service. In various implementations of the invention, UAL policy is generated from UML models as described above.

Policies expressed in the UAL may be transformed into access control mechanisms appropriate to a plurality of target systems, for example, as described in U.S. patent application Ser. No. 11/209,987, the disclosure of which is incorporated herein by reference in its entirety. Policies in a UAL policy set include one or more positive and/or negative XACML rules for an action/resource pair. UAL rules can be translated into various formats for input to various access control systems.

The foregoing apparatus and methods can be implemented in a standalone manner to convert access control requirements to XACML and/or can be integrated with other authorization and access control architectures. Thus a standards-based, cost-effective mechanism can be provided for defining and administering access control privileges, i.e., who is allowed to perform what actions on which objects or resources, e.g., read or write access to files, access to tasking orders, ability to initiate a firing action, etc. The generative approach of various implementations of the invention to access control design allows maintenance to be performed at the requirements level. The UML models can be modified and re-analyzed for correctness and consistency before revising the design models.

Capturing requirements in a formal UML model enables mechanisms to analyze them and promulgate them from standard UML representation into forms appropriate to a plurality of access control system implementations. This automatic transformation can maintain policy consistency across the different systems and lessen administrative burden. Because only two types of Constraints, Permit and Deny, are defined, from the modeler or policy analyst perspective, this arrangement affords convenience by admitting the simplest possible formal expression of an intended policy.

A process of UML modeling can explicitly describe security requirements in a formal setting so that humans can study and analyze them. The modeling process can help to resolve ambiguities and assumptions and to achieve consensus in language interpretation. Interpretations of security policies are frequently based on assumptions. Such assumptions can be discovered and captured during the modeling process so that they can be incorporated into a security system.

A formal UML requirements model facilitates consistency-checking and completeness-checking. Early consistency checking prevents potentially expensive problems later in an engineering life cycle. This capability translates into effective system engineering, product quality improvement, and business cost saving. It can be determined whether requirements are consistent among themselves and/or whether the model covers an entire requirements basis. If, for example, high-level requirements subsequently are modified, the UML model may be updated and analyzed to reflect changes.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

APPENDIX A

```xml
<?xml version="1.0" encoding="UTF-8"?>
<!DOCTYPE Policy
[
  <!ENTITY xml "http://www.w3.org/2001/XMLSchema#">
  <!ENTITY rule-combine "urn:oasis:names:tc:xacml:1.0:rule-
                                    combining-algorithm:">
  <!ENTITY policy-combine "urn:oasis:names:tc:xacml:1.0:policy-
                                    combining-algorithm:">
  <!ENTITY function "urn:oasis:names:tc:xacml:1.0:function:">
  <!ENTITY subject-category "urn:oasis:names:tc:xacml:1.0:subject-
                                    category:">
  <!ENTITY subject "urn:oasis:names:tc:xacml:1.0:subject:">
  <!ENTITY role "urn:oasis:names:tc:xacml:1.0:role:">
  <!ENTITY roles "urn:example:role-values:">
  <!ENTITY resource "urn:oasis:names:tc:xacml:1.0:resource:">
  <!ENTITY action "urn:oasis:names:tc:xacml:1.0:action:">
  <!ENTITY environment "urn:oasis:names:tc:xacml:1.0:
                                    environment:">
]>
<PolicySet
  xmlns="urn:oasis:names:tc:xacml:1.0:policy"
  xmlns:xsi="http://www.w3.org/2001/XMLSchema-instance"
  PolicySetId="Set1"
  PolicyCombiningAlgId="urn:oasis:names:tc:xacml:1.0:policy-
                                    combining-algorithm:deny-overrides">
  <Target>
    <Subjects><AnySubject/></Subjects>
    <Resources><AnyResource/></Resources>
    <Actions><AnyAction/></Actions>
  </Target>
  <Policy
      xmlns="urn:oasis:names:tc:xacml:1.0:policy"
      xmlns:xsi="http://www.w3.org/2001/XMLSchema-instance"
      xsi:schemaLocation="urn:oasis:names:tc:xacml:1.1:policy
        cs-xacml-schema-policy-01.xsd"
      PolicyId="PolicyEAR"
      RuleCombiningAlgId="&rule-combine;deny-overrides">
    <Description>
    PolicyEAR
    RuleCombining: denyOverrides
    Target: subject:AnySubject
        resource:AnyResource
        action:AnyAction
    Rule1: if resource:EAR=true AND subject:US=false then deny
    </Description>
    <PolicyDefaults>
      <XPathVersion>http://www.w3.org/TR/1999/Rec-xpath-
19991116</XPathVersion>
    </PolicyDefaults>
    <Target>
      <Subjects><AnySubject/></Subjects>
      <Resources><AnyResource/></Resources>
      <Actions><AnyAction/></Actions>
    </Target>
    <Rule RuleId="Rule1" Effect="Deny">
      <Condition FunctionId="&function;and">
        <Apply FunctionId="&function;boolean-equal">
          <Apply FunctionId="&function;boolean-one-and-only">
            <SubjectAttributeDesignator DataType="&xml;boolean"
              AttributeId="urn:oasis:names:tc:xacml:1.0:example:
                                    subject:US"/>
          </Apply>
          <AttributeValue DataType="&xml;boo-
                                    lean">false</AttributeValue>
        </Apply>
        <Apply FunctionId="&function;boolean-equal">
          <Apply FunctionId="&function;boolean-one-and-only">
            <ResourceAttributeDesignator DataType="&xml;boolean"
              AttributeId="urn:oasis:names:tc:xacml:1.0:example:resource:
                                    EAR"/>
          </Apply>
          <AttributeValue DataType="&xml;boolean">true</AttributeValue>
        </Apply>
      </Condition>
    </Rule>
  </Policy>
```

APPENDIX A-continued

```xml
<Policy
    xmlns="urn:oasis:names:tc:xacml:1.0:policy"
    xmlns:xsi="http://www.w3.org/2001/XMLSchema-instance"
    xsi:schemaLocation="urn:oasis:names:tc:xacml:1.1:policy
        cs-xacml-schema-policy-01.xsd"
    PolicyId="PolicyEngineering"
    RuleCombiningAlgId="&rule-combine;deny-overrides">
  <Description>
   PolicyEngineering
    RuleCombining: denyOverrides
    Target: subject:AnySubject
         resource:resource-id=engineering
         action-id=read_resource
    Rule1: if subject:role=CompanyAEmployee then permit
  </Description>
  <PolicyDefaults>
    <XPathVersion>http://www.w3.org/TR/1999/Rec-xpath-19991116</XPathVersion>
  </PolicyDefaults>
  <Target>
    <Subjects>
     <AnySubject/>
    </Subjects>
    <Resources>
      <Resource>
       <ResourceMatch MatchId="&function;string-equal">
         <AttributeValue DataType="&xml;string">engineering</AttributeValue>
         <ResourceAttributeDesignator DataType="&xml;string"
           AttributeId="urn:oasis:names:tc:xacml:1.0:resource:resource-id"/>
       </ResourceMatch>
      </Resource>
    </Resources>
    <Actions>
     <Action>
       <ActionMatch MatchId="&function;string-equal">
         <AttributeValue DataType="&xml;string">read_resource</AttributeValue>
         <ActionAttributeDesignator DataType="&xml;string"
           AttributeId="&action;action-id"/>
       </ActionMatch>
     </Action>
    </Actions>
  </Target>
  <Rule RuleId="Rule1" Effect="Permit">
    <Condition FunctionId="&function;string-is-in">
     <AttributeValue DataType="&xml;string">CompanyAEmployee</AttributeValue>
     <SubjectAttributeDesignator DataType="&xml;string"
        AttributeId="urn:oasis:names:tc:xacml:1.0:example:subject:role"/>
    </Condition>
  </Rule>
</Policy>
<Policy
    xmlns="urn:oasis:names:tc:xacml:1.0:policy"
    xmlns:xsi="http://www.w3.org/2001/XMLSchema-instance"
    xsi:schemaLocation="urn:oasis:names:tc:xacml:1.1:policy
        cs-xacml-schema-policy-01.xsd"
    PolicyId="PolicyEngineeringWM"
    RuleCombiningAlgId="&rule-combine;deny-overrides">
  <Description>
    PolicyEngineeringWM
    RuleCombining: denyOverrides
    Target: subject:AnySubject
         resource:resource-id=engineeringwm
         action-id=read_resource
    Rule1: if subject:role=CompanyAEmployee then permit
    Rule2: if subject:role=PartnerCEmployee then permit
  </Description>
  <PolicyDefaults>
    <XPathVersion>http://www.w3.org/TR/1999/Rec-xpath-19991116</XPathVersion>
  </PolicyDefaults>
  <Target>
    <Subjects>
     <AnySubject/>
    </Subjects>
    <Resources>
      <Resource>
       <ResourceMatch MatchId="&function;string-equal">
         <AttributeValue DataType="&xml;string">engineeringwm</AttributeValue>
         <ResourceAttributeDesignator DataType="&xml;string"
           AttributeId="urn:oasis:names:tc:xacml:1.0:resource:resource-id"/>
       </ResourceMatch>
      </Resource>
    </Resources>
    <Actions>
     <Action>
       <ActionMatch MatchId="&function;string-equal">
         <AttributeValue DataType="&xml;string">read_resource</AttributeValue>
         <ActionAttributeDesignator DataType="&xml;string"
           AttributeId="&action;action-id"/>
       </ActionMatch>
     </Action>
    </Actions>
  </Target>
  <Rule RuleId="Rule1" Effect="Permit">
    <Condition FunctionId="&function;string-is-in">
     <AttributeValue DataType="&xml;string">CompanyAEmployee</AttributeValue>
     <SubjectAttributeDesignator DataType="&xml;string"
        AttributeId="urn:oasis:names:tc:xacml:1.0:example:subject:role"/>
    </Condition>
  </Rule>
  <Rule RuleId="Rule2" Effect="Permit">
    <Condition FunctionId="&function;string-is-in">
     <AttributeValue DataType="&xml;string">PartnerCEmployee</AttributeValue>
     <SubjectAttributeDesignator DataType="&xml;string"
        AttributeId="urn:oasis:names:tc:xacml:1.0:example:subject:role"/>
    </Condition>
  </Rule>
</Policy>
<Policy
    xmlns="urn:oasis:names:tc:xacml:1.0:policy"
    xmlns:xsi="http://www.w3.org/2001/XMLSchema-instance"
    xsi:schemaLocation="urn:oasis:names:tc:xacml:1.1:policy
        cs-xacml-schema-policy-01.xsd"
    PolicyId="PolicyWiring"
    RuleCombiningAlgId="&rule-combine;deny-overrides">
  <Description>
    PolicyWiring
    RuleCombining: denyOverrides
    Target: subject:AnySubject
         resource:resource-id=wiring
         action-id=read_resource
    Rule1: if subject:role=CompanyAEmployee then permit
    Rule2: if subject:role=PartnerBEmployee then permit
  </Description>
  <PolicyDefaults>
    <XPathVersion>http://www.w3.org/TR/1999/Rec-xpath-19991116</XPathVersion>
  </PolicyDefaults>
  <Target>
    <Subjects>
     <AnySubject/>
    </Subjects>
    <Resources>
      <Resource>
       <ResourceMatch MatchId="&function;string-equal">
         <AttributeValue DataType="&xml;string">wiring</AttributeValue>
         <ResourceAttributeDesignator DataType="&xml;string"
           AttributeId="urn:oasis:names:tc:xacml:1.0:resource:resource-id"/>
       </ResourceMatch>
      </Resource>
    </Resources>
    <Actions>
     <Action>
       <ActionMatch MatchId="&function;string-equal">
         <AttributeValue DataType="&xml;string">read_resource</AttributeValue>
```

APPENDIX A-continued

```
      <ActionAttributeDesignator DataType="&xml;string"
        AttributeId="&action;action-id"/>
      </ActionMatch>
    </Action>
  </Actions>
</Target>
<Rule RuleId="Rule1" Effect="Permit">
  <Condition FunctionId="&function;string-is-in">
    <AttributeValue
DataType="&xml;string">CompanyAEmployee</AttributeValue>
    <SubjectAttributeDesignator DataType="&xml;string"
      AttributeId="urn:oasis:names:tc:xacml:1.0:example:
                                       subject:role"/>
  </Condition>
</Rule>
<Rule RuleId="Rule2" Effect="Permit">
  <Condition FunctionId="&function;string-is-in">
    <AttributeValue
DataType="&xml;string">PartnerBEmployee</AttributeValue>
    <SubjectAttributeDesignator DataType="&xml;string"
      AttributeId="urn:oasis:names:tc:xacml:1.0:example:
                                       subject:role"/>
  </Condition>
</Rule>
</Policy>
</PolicySet>
```

What is claimed is:

1. A method of providing policies for controlling access to resources of a system, the method comprising the steps of:
defining a plurality of authorization requirements for accessing a plurality of resources of a system in which access to the resources is controlled by a plurality of heterogeneous access control mechanisms;
inputting the authorization requirements to a computer to obtain a model representing contents of policies for controlling access to the resources;
using the computer, generating from the model a single set of attribute-based policies expressed in an authorization markup language and capturing the contents, the policy set adaptable for use by each of the heterogeneous access control mechanisms for controlling access to the resources; and
wherein the authorization markup language is configured to provide a single expression of a policy adaptable across a plurality of access control domains associated with the heterogeneous access control mechanisms.

2. The method of claim 1, wherein obtaining the model comprises modeling a subject having a role, an action that mediates an access attempt by the subject, and a policy constraint that is either a permit constraint or a deny constraint relative to the action.

3. The method of claim 2, wherein the subject includes a first attribute, a resource includes a second attribute, and obtaining the model comprises modeling a policy as a constraint on an action based on the attributes.

4. The method of claim 1, wherein the model includes a plurality of UML use case instantiations.

5. The method of claim 1, wherein the authorization markup language includes only one combining algorithm.

6. The method of claim 5, wherein the authorization markup language is a subset of XACML.

7. The method of claim 1, wherein all conditions of the attribute-based policies are contained in <Rule> and <Target> elements of the authorization markup language.

8. A method of providing policies for controlling access to resources of a system, the method comprising the steps of:
defining a plurality of authorization requirements for accessing a plurality of resources of a system in which access to the resources is controlled by a plurality of heterogeneous access control mechanisms;
inputting the authorization requirements to a computer to obtain a model expressing each of a plurality of access control policies for controlling access to the resources as a permit constraint or as a deny constraint;
using the computer, generating from the model a single policy set in an authorization markup language that captures the requirements, the policy set adaptable for use by each of the heterogeneous access control mechanisms for controlling access to the resources; and
wherein the authorization language is configured to provide a single expression of a policy adaptable across a plurality of access control domains associated with the heterogeneous access control mechanisms.

9. The method of claim 8, wherein the model includes a plurality of UML use case instantiations as class diagrams.

10. The method of claim 9, wherein the constraints are specified in OCL.

11. The method of claim 8, wherein generating a single policy set comprises constructing one or more rules for each of the constraints.

12. The method of claim 8, wherein each policy of the policy set is attribute-based.

13. The method of claim 8, further comprising expressing a subject role as an attribute of the subject to aggregate the subject into a group associated with one or more of the permit and/or deny constraints.

14. An apparatus for defining policies for controlling access to resources of a system, the apparatus comprising a processor and memory configured to:
receive a plurality of authorization requirements defined for accessing a plurality of resources of a system in which access to the resources is controlled by a plurality of heterogeneous access control mechanisms;
use the authorization requirements to obtain a model expressing each of a plurality of attribute-based access control policies as a constraint; and
generate from the model a single policy set in an authorization markup language that captures the access control policies, the policy set adaptable for use by each of the heterogeneous access control mechanisms for controlling access to the resources; and
wherein the authorization language is configured to provide a single expression of a policy adaptable across a plurality of access control domains associated with the heterogeneous access control mechanisms.

15. The apparatus of claim 14, wherein the processor and memory are further configured to:
extract the constraints from the model; and
construct one or more XACML rules for each constraint; and
input the rules to the single policy set.

16. The apparatus of claim 14, wherein the processor and memory are further configured to extract policy semantics from the model to generate the policy set.

17. The apparatus of claim 14, wherein the authorization markup language is a subset of XACML.

* * * * *